UNITED STATES PATENT OFFICE.

ANDREW WORTHINGTON BILLINGS, OF BROOKLYN, NEW YORK.

PROCESS OF MANUFACTURING BEER AND ALE.

SPECIFICATION forming part of Letters Patent No. 466,151, dated December 29, 1891.

Application filed August 4, 1891. Serial No. 401,622. (No specimens.)

*To all whom it may concern:*

Be it known that I, ANDREW WORTHINGTON BILLINGS, a citizen of the United States, residing in Brooklyn, Kings county, New York, have invented certain new and useful Improvements in the Process of Manufacturing Beer and Ale, of which the following is a specification.

The use of raw grain in the manufacture of beer or ale has necessitated important changes in the usual methods employed in the manufacture of this article from malt alone. The changes have been principally made with a view to increase the yield of the raw grain and improve the filtration of the wort without, however, contaminating the latter with soluble starch. In order to accomplish this, it has hitherto been considered necessary to make two mashes—one a supplemental mash, containing raw grain, water, and a portion of the malt used in the brew, the other the main mash, consisting entirely of malt and water. At a certain stage of the process the supplemental mash is discharged into the main or malt mash and the mashing operations then continued as in the ordinary manufacture of beer. One of the reasons why a supplemental raw-grain mash has been considered necessary is the high temperature and thorough agitation required to completely disintegrate and rupture the starch-cells contained in the raw grain and thereby expose their contents in a gelatinized condition to the action of the diastase or the starch-converting albumenoids contained in the malt, whereas if the malt mash were exposed to the same agitation and high temperature not only would coagulation of the diastase and entire destruction of its starch-converting power take place, but also the subsequent filtration of the wort would be rendered difficult. Hence it has been deemed essential, in order to obtain a proper yield both from the raw grain and the malt, to prepare the raw-grain mash in a separate apparatus, and when in proper condition to discharge it into the main or malt mash-tub, wherein the mashing operations are completed.

A number of disadvantages always attend the making of a supplemental and a main mash, and it is desirable and of great importance in the manufacture of beer to simplify this part of the process. Among the disadvantages attending the carrying on of two separate mashes may be mentioned the increased cost of apparatus and the additional skilled labor, time, and steam required; also, the uncertainty of the yield, which depends to a large extent on the care exercised in conducting the making of the supplemental mash and discharging it at the proper time into the main mash, together with difficulties in filtration of the wort, occasioned by an improper mixing of the two mashes.

The object of this invention is to obviate the above difficulties by preparing the raw grain and effecting the conversion of all the starch contained both in the raw grain and the malt in one apparatus, and substantially in one operation, without impairing the action of the diastase and without decomposing the fats, and thereby forming fusel-oil and other empyreumatic products, or interfering with the filtering, whereby the yield is materially increased and rendered positive, a proper filtration of the wort is effected, less labor, steam, and time are required to carry out the operation, and the cost of the apparatus is materially reduced.

In carrying out this process the raw grain, either whole or ground, together with a suitable quantity (say from one per cent. to twenty-five per cent. of its weight) of malt and the necessary water, are introduced into the mashing apparatus described in Letters Patent No. 398,374, granted to me February 26, 1889, and the mash is then gradually elevated in temperature by the injection of live steam or indirectly by means of a steam jacket or coil to about 146° Fahrenheit. The object in bringing the mash to the above temperature of 146° is to enable the diastase, which is most active at that temperature, to convert any free starch present in the mass and to soften the outer cell-walls in which the starch granules are contained. After this effect has been accomplished the mash is rapidly increased in temperature to a point sufficiently high to thoroughly gelatinize the starch contained in the raw grain. This point, depending upon the raw grain used, will vary from 180° to 212° Fahrenheit. The mash is maintained at this temperature from ten to fifteen minutes, according to the character of the grain. It should be understood that the temperature and time thus specified are the extreme temperature and extreme time that would be required in operating upon raw grain of the most refractory character, and that with grains of softer texture the temperature and the time of the action are correspondingly reduced, and that with grains of extreme softness it is only necessary to maintain such a temperature and for such a time as to produce the desired effect—that is, the thorough disintegration of the outer cell-walls and the liberation of the granules of starch, but without the decomposition of any fats and the production of empyreumatic products, including fusel-oil, butyric acid, &c.—for it should be understood that an extreme high temperature, even 210° to 212°, maintained for even fifteen minutes upon many qualities of grain would result in the production of a solution unfit for the manufacture of a merchantable product, and in any case, whatever the character of the grain and however refractory it may be, no practical result would ensue from maintaining the mash at a high temperature for over fifteen minutes. As soon, therefore, as the outer cuticle is broken up and the starch granules are eliminated, and without any further delay, the mash is then rapidly cooled down below 165° Fahrenheit by the direct introduction of cold water or by the circulation of cold water through the coil or jacket. At this period the balance of the malt required for the brew is then added, and if sufficient water has not been introduced while cooling the mash an additional quantity is now run in to enable the stirrers to easily agitate the mass, care being taken to avoid lowering the temperature below 155° in order to avoid the forming of lactic acid. The mash is then discharged rapidly into a separate filtering-tub having a perforated false bottom.

I have found it preferable to cover the bottom of the filtering-tub with sufficient hot water to form a cushion for the reception of the entering mash. The mash is usually allowed to stand in the filtering-tub from thirty to forty minutes or longer, when the taps can be opened and the filtered wort passing through the perforations in the false bottom can be pumped into the kettle. During this operation hot water is sparged on the surface of the grains remaining in the filtering-tub until the soluble matter contained therein has been thoroughly extracted. The sparge or wash-water is then mixed with the wort contained in the kettle, and the subsequent boiling of the wort with hops, cooling, and then fermenting continued, as in ordinary brewing.

What I claim is—

The improvement in the manufacture of beer or ale, consisting in making a mash by mixing together raw grain and water and a portion of malt, gradually raising the temperature of this mash to the neighborhood of 146° Fahrenheit, then rapidly heating it to between 180° and 212° Fahrenheit, maintaining it at this temperature for a sufficient length of time to disintegrate the outer cuticle and dissolve the starch-cells without the formation of empyreumatic products, then cooling it rapidly to below 165° Fahrenheit, then adding the remaining portion of malt required for the brew, maintaining it meanwhile at a temperature of over 155°, the wort being subsequently filtered out and subjected to further operations, as in ordinary brewing, substantially as described.

In testimony whereof I have signed my name to this specification in the presence of two subscribing witnesses.

ANDREW WORTHINGTON BILLINGS.

Witnesses:
DANIEL FRENCH, Jr.,
GEO. W. DAWSON.